United States Patent [19]
Mima et al.

[11] 3,812,251
[45] May 21, 1974

[54] STABILIZED AQUEOUS COMPOSITION

[75] Inventors: Hiroyuki Mima, Nishinomiya;
Toichiro Matsuzaki, Ikeda, both of Japan

[73] Assignee: Takeda Chemical Industries, Ltd., Osaka, Japan

[22] Filed: Apr. 12, 1971

[21] Appl. No.: 133,380

Related U.S. Application Data

[63] Continuation-in-part of Ser. No. 689,276, Dec. 11, 1967, abandoned.

[30] Foreign Application Priority Data
Dec. 10, 1966 Japan.............................. 41-81127

[52] U.S. Cl................. 424/148, 424/203, 424/280
[51] Int. Cl........................................ A61k 15/12
[58] Field of Search.................... 424/148, 280, 203

[56] References Cited
UNITED STATES PATENTS
2,445,366  7/1948  Rigby.................................. 424/148

OTHER PUBLICATIONS
Cutolo et al., Chemical Abstracts, 56:8827c, 1962.

*Primary Examiner*—Albert T. Meyers
*Assistant Examiner*—Norman A. Drezin
*Attorney, Agent, or Firm*—Wenderoth, Lind & Ponack

[57] ABSTRACT

An aqueous composition comprising an ascorbic acid phosphate is stabilized by the addition of boric acids and/or their water-soluble salts in a quantity in terms of orthoboric acid of at least about 0.6 mole per mole of the ascorbic acid phosphate and of from about 0.03 to about 3 percent based on the weight of the water in the composition.

12 Claims, No Drawings

STABILIZED AQUEOUS COMPOSITION

This application is a continuation-in-part of Ser. No. 689,276, filed Dec. 11, 1967, now abandoned.

This invention relates to a stabilized aqueous composition comprising as a solute any of ascorbic acid 2-phosphate, ascorbic acid 3-phosphate and their water-soluble salts.

It is known that ascorbic acid 3(or 2)-phosphate not only shows vitamin C-activity equal to that of ascorbic acid or its fatty acid esters but also is more stable against oxidation than ascorbic acid or its fatty acid esters. However, the ascorbic acid phosphate is not perfectly stable against oxidation and therefore aqueous compositions, such as cosmetic compositions, containing the ascorbic acid phosphate are inevitably subjected, during prolonged storage, to undesirable changes such as yellow or redbrown coloration and foaming and also to oxidative degradation.

The present invention is directed to the embodiment of a stabilized composition containing such ascorbic acid phosphate, the principal object of the present invention being to provide a stabilized aqueous composition containing the ascorbic acid phosphate.

Another object of the present invention is to provide a commercially valuable composition, useful as a cosmetic composition or as an eye lotion, for example, containing vitamin C-active substances in a stabilized condition.

Further object of the present invention is to provide a novel method for stabilizing ascorbic acid phosphate in an aqueous composition.

The said objects are realized by dissolving a specified quantity of a borate together with the ascorbic acid phosphate in an aqueous composition and adjusting the pH value of the composition to between about 6 and about 9.

"Ascorbic acid" in the present specification and claims is intended to include L-ascorbic acid and D-arabo-ascorbic acid. Ascorbic acid 2-phosphate and/or ascorbic acid 3-phosphate employed in this invention are obtained by, for example, reacting ascorbic acid or the corresponding 5,6-isopropylidene ascorbic acid with about one mol of a phosphorylating agent, e.g. phosphorus oxychloride, relative to the ascorbic acid or 5,6-isopropylidene-ascorbic acid in a ketone (e.g. acetone, methyl ethyl ketone, methyl isobutyl ketone, etc.) in the presence of not less than 3 moles of a tertiary amine (e.g. pyridine, picoline, lutidine, triethylamine, dimethylaniline, quinoline, etc.) relative to the ascorbic acid or 5,6-isopropylidene-ascorbic acid at room temperature (about 15° to about 30°C) or under ice-cooling for about 1 to 6 hours, and by the addition of an alkaline substance (e.g. sodium hydroxide, calcium hydroxide, magnesium oxalate, etc.) to the resultant mixture, followed by, upon necessity, subjecting thus-obtained mixture to purification by means of ion-exchange resins, e.g. on Dowex-1 utilizing a solution of sodium bicarbonate as developer.

These ascorbic acid phosphates can be employed in the form of their water-soluble salts, such as the alkaline earth metal salt (e.g. magnesium salt, calcium salt) and the alkali metal salt (e.g. sodium salt, potassium salt) as well as in their free form.

"Borate" in the present specification as well as claims includes, for example, orthoborate, metaborate and tetraborate, and it may be employed as water-soluble salt such as the alkaline earth metal salt (e.g. magnesium salt, calcium salt) and the alkali metal salt (e.g. sodium salt, potassium salt) as well as in the free form. Practically, borax ($Na_2B_4O_7 \cdot 10H_2O$) is most advantageously employed.

Stabilizing effect brought by the present invention on the storage of magnesium L-ascorbic acid 3-phosphate at 40°C is shown in the following Table 1. In Table 1, (I), (II), (III) and (IV) designate 1% solution of magnesium L-ascorbic acid 3-phosphate dissolved in a 0.05M borax solution adjusted to pH 7.9 with 0.1N—HCl, a 0.05M borax solution of pH 8.25, a 0.066M phosphate buffer solution of pH 7.9, and water, respectively.

Table 1

| Samples | Percent of remaining magnesium L-ascorbic acid 3-phosphate | | | Changes in appearance | | | | | |
| --- | --- | --- | --- | --- | --- | --- | --- | --- | --- |
| | | | | 14 days | | 21 days | | 28 days | |
| | 14 days | 21 days | 28 days | Coloration * | Turbidity or precipitation | Coloration * | Turbidity or precipitation | Coloration * | Turbidity or precipitation |
| (I) | 96.0 | 95.5 | 95.1 | 0.015 | — | 0.014 | — | 0.017 | — |
| (II) | 95.3 | 93.9 | 93.3 | 0.027 | — | 0.027 | — | 0.029 | — |
| (III) | 85.2 | 84.2 | 83.9 | 0.114 | + | 0.139 | + | 0.158 | + |
| (IV) | 90.8 | 89.1 | 88.5 | 0.058 | + | 0.087 | + | 0.108 | + |

* Measured by absorption at 430 mμ.

It is to be noted from Table 1 that the desired stabilization of the ascorbic acid phosphate cannot be attained by the phosphate buffer solution used in III, i.e. the one having a pH equal to that of the borax solution of I.

In preparing the stabilized aqueous composition of the present invention, the ascorbic acid phosphate and the borate are dissolved in an aqueous solution which may contain any other acceptable ingredients depending on the use of the objective composition, and the pH of the composition is adjusted to between about 6 and about 9, preferably between about 7 and about 8.

The amount of the borate in terms of orthoboric acid should, from the viewpoint of stabilizing effect, be at least about 0.6 mole per mole of the ascorbic acid phosphate, while from the standpoint of the practical use of the aqueous composition e.g. as cosmetic or eye lotion, it should be between from about 0.03 to about 3 percent by weight of the water. More advantageously, borate in a quantity in terms of orthoboric acid between about 0.8 and about 20 moles per mole of the ascorbic acid phosphate and, at the same time, between about 0.06 and about 2 percent by weight of the water is usually employed.

The stabilized aqueous composition of the present invention may take such a form as cosmetics, e.g. cosmetic milk, cosmetic cream, cosmetic skin lotion. In this case, the cosmetic, the aqueous phase of which is a stabilized aqueous composition, can be prepared by any per se known method, for example, that described in R. G. Harry, "The Principles and Practice of Modern Cosmetics," Volume One, Modern Cosmeticology, published by Leonard Hill in 1965, New York, N.Y., for example, by homogeneously admixing the ascorbic acid phosphate and the borate with cosmetic base material including water. More concretely stated, the cosmetics can be prepared by stirring together at about 40° to about 90°C. the ascorbic acid phosphate, the borate and cosmetic base materials, such as a surface active agent (e.g. sorbitan fatty acid esters such as sorbitan monolaurate, sorbitan monopalmitate, etc., polyoxyethylene sorbitan fatty acid esters such as polyoxyethylene sorbitan monolaurate, polyoxyethylene sorbitan monopalmitate, etc., polyoxyethylene higher alcohol ethers such as polyoxyethylene lauryl alcohol, polyoxyethylene cetyl alcohol, etc., polyoxyethylene alkyl aryl ethers such as polyoxyethylene nonylphenol, polyoxyethylene octylphenol, etc., glyceryl monofatty acid esters such as glyceryl monostearate, etc.), preservative agent (e.g. methyl p-hydroxybenzoate, ethyl p-hydroxybenzoate, propyl p-hydroxybenzoate, benzyl p-hydroxybenzoate, o-phenylphenol, dehydroacetic acid, sorbic acid, etc.), a humectant (e.g. glycerin, polyethyleneglycol, etc.), fatty material (e.g. stearic acid, palmitic acid, isopropyl alcohol, cetyl alcohol, olive oil, castor oil, hydrous lanolin, Vaseline, liquid paraffin, spermaceti, isopropyl myristate, isopropyl palmitate, beeswax, etc.), perfume and water, in a per se conventional manner. Amounts and kinds of the cosmetic base materials and the mixing procedure may vary with the kind of desired cosmetics.

Both the ascorbic acid phosphate and the borate can be mixed with base material, for example, addition thereof to the base materials may be in the form of an aqueous solution, or they may be added directly to the cosmetic base materials.

The amount of the ascorbic acid phosphate to be added to the cosmetic may vary, with the kinds of cosmetics, etc., and generally ranges from about 0.05 to about 5 weight percent, particularly from about 0.1 percent to about 3 percent.

Thus-prepared cosmetics containing the ascorbic acid phosphate together with the borate in its aqueous phase show vitamin C-activity and are more stable than cosmetics containing ascorbic acid or its fatty acid esters, or the ascorbic acid phosphate only, and, therefore, they retain the effects of vitamin C in topical use (e.g. whitening skin, strengthening collagen fibers, and preventing the skin from infection by virtue of the bactericidal or bacteriostatic properties of vitamin C) for a much longer time than cosmetics containing only the ascorbic acid phosphate.

Presently preferred illustrative embodiments of the invention are set forth in the following examples. In these examples, parts by weight bear the same relation to parts by volume as do grams to milliliters. Temperatures are in degrees centigrade.

PREPARATION OF ASCORBIC ACID PHOSPHATES

To 7.85 g. of ascorbic acid dissolved in 200 ml. of acetone was added dropwise 7.4 g. of phosphorus oxychloride at room temperature under stirring, and the mixture was agitated for 60 minutes. The reaction mixture was cooled to 0°C, followed by the addition of 24.0 g. of pyridine dropwise thereto. The mixture was stirred for 5 hours at 0°C, whereby phosphorylation took place. The reaction mixture was concentrated to dryness under reduced pressure to give 42 g. of residue.

The residue was dissolved in 150 ml. of water. The aqueous solution was allowed to pass through a column (3.5 cm. × 40 cm.) packed with 500 ml. of Amberlite IR-120 (H-form, Rohm & Hass Co.). The effluent was neutralized with magnesium oxide, filtered from the solid material and concentrated to 70 ml. The concentrate was adjusted to pH 4.5 and 200 ml. of ethyl alcohol was added thereto under stirring to give 12 g. of colorless precipitates. 10 g. of the precipitates was dissolved in 100 ml. of water and the solution was allowed to pass through a column (3 cm. × 20 cm.) packed with 200 ml. of Amberlite IR-120 (H-form). The effluent was concentrated under reduced pressure to 25 ml. To the concentrate was added 40 ml. of Dowex-1X8-bicarbonate (from 200 to 400 mesh pass). The mixture was constantly stirred until evolution of carbon dioxide gas ceased. The resulting slurry was placed on top of a column (4 cm. × 25 cm.) packed with 300 ml. of Dowex-1X8-bicarbonate. The column was washed with 500 ml. of water and elution with sodium bicarbonate was begun (zero volume was taken at this point), the flow rate being about 1.8 ml./min. The elution with 3100 ml. of 0.4M-sodium bicarbonate gave peak I. The elution with 1100 ml. of 0.6M-sodium bicarbonate gave peak II and subsequent elution with 600 ml. of the same gave peak III. The final elution with 600 ml. of 3N-ammonia gave peak IV.

The fractions corresponding to peak I were collected, evaporated in vacuo to about 50 ml. After being left standing at 0°C for 1 hour, sodium bicarbonate was removed by filtration, The filtrate was again evaporated to about 15 ml. The concentrate was kept at 5°C and filtered. The filtrate was allowed to pass through a column (1.5 cm. × 10 cm.) packed with 60 ml. of Amberlite IR-120 (H-form). After washing the column with 100 ml. of water, the effluent combined with the washing was neutralized with magnesium oxide and allowed to stand for a day. The solution was filtered and concentrated to 30 ml., and 200 ml. of methyl alcohol was added slowly to the concentrate with stirring to give 4.0 g. of colorless precipitates. Recrystallization of the precipitates from water-methyl alcohol gave 2.8 g. of magnesium L-ascorbic acid 3-phosphate as colorless crystalline powder.

Elementary analysis:
Calculated for $C_6H_6O_9PMg3/2 \cdot 5H_2O$: C 19.0%, H 4.22%, P 8.18%, Mg 9.63%
Found: C 18.88%, H 4.15%, P 8.14%, Mg 9.81%

An analysis of this product by paper partition chromatogram developed with a solvent system of n-propanol/water/28 percent ammonia (60:30:10) gave a single spot at an Rf value of 0.15.

On the other hand, the fractions corresponding to peak IV were collected and evaporated under reduced pressure to 300 ml. The concentrate was treated with 600 ml. of Amberlite IR-120 (H-form) and neutralized with magnesium oxide. The solution was condensed to about 20 ml. in vacuo. By repeated recrystallization from a mixture of water and ethyl alcohol, 2.2 g of magnesium L-ascorbic acid 2-phosphate was obtained as colorless crystalline powder.

Elementary analysis:

Calculated for $C_6H_7O_9PM_g \cdot 4H_2O$: C 20.55%, H 4.32%, P 8.84%, Mg 6.94%
Found: C 20.74%, H 4.46%, P 8.99%, Mg 6.67%

Paper partition chromatography of this product employing the same developer as described above gave a single spot at an Rf value of 0.13.

EXAMPLE 1

19.1 Parts by weight of borax is dissolved in distilled water to make the total volume 1,000 parts. On the other hand, 8.4 parts by volume of 36.5 percent hydrochloric acid is diluted with distilled water to 1,000 parts by volume. 55 Parts by volume of the borax solution is adjusted to pH 7.9 by the addition of 45 parts by volume of the hydrochloric acid solution. In the solution is dissolved 1 part by weight of magnesium L-ascorbic acid 3-phosphate to make the total volume 100 parts.

The stabilized aqueous composition thus prepared has a pH value of 7.68. The percent of remaining magnesium L-ascorbic acid 3-phosphate in the composition after storage at 40°C for 4 weeks is about 95.1 percent.

EXAMPLE 2

19.1 Parts by weight of borax is dissolved in distilled water to make the total volume 1000 parts. On the other hand, 12.4 parts by weight of orthoboric acid and 2.92 parts by weight of sodium chloride are dissolved in distilled water to 1000 parts by volume. 30 Parts by volume of the borax solution is adjusted to pH 8.1 by the addition of 70 parts by volume of the orthoboric acid-sodium chloride solution. In the solution is dissolved 1 part by weight of an about equimolar mixture of magnesium L-ascorbic acid 3-phosphate and magnesium L-ascorbic acid 2-phosphate to make the total volume 100 parts. The pH value of the stabilized aqueous composition thus prepared is 8.0.

EXAMPLE 3

19.1 Parts by weight of borax is dissolved in distilled water to make the total volume 1,000 parts. On the other hand, 8.4 parts by volume of 36.5 percent hydrochloric acid is diluted with distilled water to 1,000 parts by volume. 55 Parts by volume of the borax solution is adjusted to pH 7.9 by the addition of 45 parts by volume of the hydrochloric acid solution. In the solution is dissolved 1 part by weight of sodium L-ascorbic acid 3-phosphate to make the total volume 100 parts. The pH value of the stabilized aqueous composition thus prepared is 7.82.

EXAMPLE 4

0.95 Part by weight of borax is dissolved in distilled water to make the total volume 1,000 parts. On the other hand, 0.42 part by volume of 36.5 percent hydrochloric acid is diluted with distilled water to 1,000 parts by volume. 55 Parts by volume of the borax solution is adjusted to pH 8.0 by the addition of 45 parts by volume of the hydrochloric acid solution. In the solution is dissolved 1.5 parts by weight of an about equimolar mixture of magnesium D-araboascorbic acid 3-phosphate and magnesium D-araboascorbic acid 2-phosphate to make the total volume 100 parts. The pH value of the stabilized aqueous composition thus prepared is 7.9.

EXAMPLE 5

| | Part(s) by weight |
|---|---|
| (a) Liquid paraffin | 3.25 |
| (b) Isopropyl myristate | 0.3 |
| (c) Cetyl alcohol | 0.6 |
| (d) Ethylene glycol monostearate | 1.1 |
| (e) Polyoxyethylene cetyl ether (3 moles ethylene oxide) | 2.2 |
| (f) Polyoxyethylene stearyl ether (8 moles ethylene oxide | 0.3 |
| (g) Polyoxyethylene octyl ether (10 moles ethylene oxide | 0.2 |
| (h) Water | 86.0 |
| (i) Methyl p-hydroxybenzoate | 0.15 |
| (j) Magnesium L-ascorbic acid 3-phosphate | 0.5 |
| (k) Borax | 0.3 |
| (l) 36.5% Hydrochloric acid | 0.02 |
| (m) Glycerin | 5.0 |
| (n) Perfume | 0.5 |

A mixture of (a) through (g) is heated to 80°C to make Mixture I. A mixture of (h) through (m) is heated to 80°C to make Mixture II. Mixture II is added slowly to Mixture I with stirring. The resulting mixture is cooled to 45°C and mixed with (n) to obtain O/W cosmetic milk, the aqueous phase of which is a stabilized aqueous composition of pH 8 containing magnesium L-ascorbic acid 3-phosphate.

EXAMPLE 6

| | Parts by weight |
|---|---|
| (a) Olive oil, as a vegetable oil | 3 |
| (b) Lanolin | 2 |
| (c) Isopropyl myristate | 6 |
| (d) Cetyl alcohol | 3 |
| (e) Glycerin monostearate | 11 |
| (f) Polyoxyethylene stearyl ether (15 moles ethylene oxide) | 5 |
| (g) Polyethylene glycol (M.W. of 1540) | 3 |
| (h) Propyl p-hydroxybenzoate | 0.1 |
| (i) Water | 62.4 |
| (j) Methyl p-hydroxybenzoate | 0.1 |
| (k) Magnesium L-ascorbic acid 3-phosphate | 3 |
| (l) Borax | 0.7 |
| (m) 36.5% hydrochloric acid | 0.07 |
| (n) Sodium pyrosulfite | 0.1 |
| (o) Perfume | 0.5 |

A mixture of (a) through (h) is heated to 75°C to make Mixture I. A mixture of (i) through (n) is heated to 75°C to make Mixture II. Mixture II is added to Mixture I with stirring. The resulting mixture is cooled to 50°C and mixed with (o) to obtain O/W cosmetic cream, the aqueous phase of which is a stabilized aqueous composition of pH 7.5 containing magnesium L-ascorbic acid 3-phosphate.

EXAMPLE 7

| | Parts by weight |
|---|---|
| (a) An about equimolar mixture of sodium L-ascorbic acid 3-phosphate and sodium L-ascorbic acid 2-phosphate | 0.5 |
| (b) Glycerin | 2 |
| (c) Sodium pyrosulfite | 0.05 |
| (d) 95% Ethyl alcohol | 10 |
| (e) Methyl p-hydroxybenzoate | 0.1 |
| (f) Polyoxyethylene adduct of hydrogenated castor oil (50 moles ethylene oxide) | 0.6 |
| (g) Borax | 1 |
| (h) 36.5% hydrochloric acid | 0.1 |

EXAMPLE 7 — Continued

|  | Parts by weight |
|---|---|
| (i) Water | 85.45 |
| (j) Perfume | 0.2 |

Ingredients (a) through (j) are mixed together under stirring to yield a stabilized skin tonic of pH 7.7 containing a mixture of sodium L-ascorbic acid 3-phosphate and sodium L-ascorbic acid 2-phosphate.

EXAMPLE 8

|  | Parts by weight |
|---|---|
| (a) Sodium L-ascorbic acid 3-phosphate | 1 |
| (b) Methyl p-hydroxybenzoate | 0.1 |
| (c) Borax | 0.3 |
| (d) 36.5% Hydrochloric acid | 0.02 |
| (e) Sodium chloride | 0.5 |

Ingredients (a) through (e) are dissolved in 100 parts by volume of distilled water to obtain stabilized eye water of pH 7.8 containing sodium L-ascorbic acid 3phosphate.

What is claimed is:

1. A stabilized aqueous composition which comprises water as solvent and as solutes (1) an alkaline earth metal salt or an alkali metal salt of L-ascorbic acid 3-phosphate and (2) a borate selected from the group consisting of orthoboric acid, borax and mixtures thereof, the pH value of the aqueous compositions being from about 6 to 9, the quantity of the borate in terms of orthoboric acid being at least about 0.6 mole per mole of the ascorbic acid phosphate and ranging from about 0.03 to about 3 percent by weight of the water.

2. A stabilized aqueous composition as claimed in claim 1, wherein the quantity of the borate in terms of orthoboric acid ranges from about 0.8 to about 20 moles per mole of the ascorbic acid monophosphate and from about 0.06 to about 2 percent by weight of the water.

3. A stabilized aqueous composition as claimed in claim 1, wherein the pH value ranges from about 7 to about 8.

4. A stabilized aqueous composition as claimed in claim 1, wherein the salt is magnesium salt.

5. A stabilized aqueous composition as claimed in claim 1, wherein the borate is borax.

6. A stabilized aqueous composition as claimed in claim 1, wherein the ascorbic acid phosphate is magnesium ascorbic acid 3-phosphate and the borate is borax.

7. A method for stabilizing an alkaline earth metal salt or alkali metal salt of L-ascorbic acid 3-phosphate, dissolved in an aqueous composition which comprises adding to the aqueous composition a borate selected from the group consisting of orthoboric acid, borax and mixtures thereof in a quantity, in terms of orthoboric acid, of at least about 0.6 mole per mole of the ascorbic acid phosphate and of from about 0.03 to about 3 percent by weight of the water in the composition, and adjusting the composition to a pH value between about 6 and about 9.

8. A method as claimed in claim 7, wherein the salt is magnesium salt.

9. A method as claimed in claim 7, wherein the ascorbic acid phosphate is magnesium ascorbic acid 3-phosphate and the borate is borax.

10. A method as claimed in claim 7, wherein the quantity of the borate in terms of orthoboric acid is from about 0.8 to about 20 moles per mole of the ascorbic acid phosphate, and from about 0.06 to about 2 percent by weight of the water.

11. A method as claimed in claim 7, wherein the aqueous composition is adjusted to a pH value between about 7 and about 8.

12. A method as claimed in claim 7, wherein the borate is borax.

* * * * *